US010039416B2

(12) United States Patent
Lee et al.

(10) Patent No.: US 10,039,416 B2
(45) Date of Patent: *Aug. 7, 2018

(54) PANCAKE MAKER APPARATUS, METHODS AND SYSTEMS

(71) Applicant: TECA TECHNOLOGIES LIMITED, Kent (GB)

(72) Inventors: Andrew James Lee, Kent (GB); Preston Moeller, Cleveland, NC (US); Zhong Quan Si, Shenzhen (CN)

(73) Assignee: TECA TECHNOLOGIES LIMITED, Kent (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/632,666

(22) Filed: Jun. 26, 2017

(65) Prior Publication Data
US 2017/0340165 A1 Nov. 30, 2017

Related U.S. Application Data

(63) Continuation of application No. 14/556,777, filed on Dec. 1, 2014, now Pat. No. 9,687,110.

(60) Provisional application No. 61/911,996, filed on Dec. 4, 2013, provisional application No. 62/016,068, filed on Jun. 23, 2014.

(51) Int. Cl.
*A47J 37/06* (2006.01)
*A47J 37/10* (2006.01)

(52) U.S. Cl.
CPC ........... *A47J 37/067* (2013.01); *A47J 37/105* (2013.01)

(58) Field of Classification Search
CPC .............................. A47J 37/067; A47J 37/105
USPC .................................................... 99/353, 424
See application file for complete search history.

(56) References Cited

U.S. PATENT DOCUMENTS

| 1,848,104 | A | * | 3/1932 | Brand | .................... | A21C 15/00 |
| | | | | | | 99/334 |
| 1,869,539 | A | * | 8/1932 | Brand | ...................... | A21B 5/02 |
| | | | | | | 126/338 |
| 2,830,529 | A | * | 4/1958 | Jaffe | ........................ | A21B 5/03 |
| | | | | | | 99/335 |
| 3,092,014 | A | * | 6/1963 | MacChi | ................... | A21B 5/03 |
| | | | | | | 99/423 |
| 3,215,062 | A | * | 11/1965 | Frankenberg | ............ | A21B 5/03 |
| | | | | | | 99/353 |

(Continued)

*Primary Examiner* — Sean Michalski
(74) *Attorney, Agent, or Firm* — Tillman Wright, PLLC; Chad D. Tillman

(57) ABSTRACT

A cooking apparatus includes first and second griddles, each having a generally planar cooking surface for cooking food. A first lifting mechanism is configured to elevate the first griddle such that a food item on the cooking surface of the first griddle is predisposed to fall onto the cooking surface of the second griddle. A first wiper is configured to sweep the cooking surface of the first griddle to facilitate detachment of any food item attached to the cooking surface of the first griddle for transfer such food item to the cooking surface of the second griddle. The first and second griddles, first lifting mechanism, and first wiper are interconnected preferably to form a portable, integrated cooking product. These components preferably are enclosed within a housing for presenting a refined consumer product for use in a home kitchen and are arranged so as to define a compact volume and footprint.

20 Claims, 13 Drawing Sheets

(56) References Cited

U.S. PATENT DOCUMENTS

| | | | | | |
|---|---|---|---|---|---|
| 3,683,150 | A | * | 8/1972 | Kehl | A47J 37/0676 219/200 |
| 3,718,487 | A | * | 2/1973 | Brunner | A21B 5/03 99/353 |
| 4,280,402 | A | * | 7/1981 | Featherstone | A21B 5/03 425/335 |
| 4,508,025 | A | * | 4/1985 | Schultz | A47J 37/046 198/406 |
| 4,733,608 | A | * | 3/1988 | Merdy | A21B 5/03 99/353 |
| 5,320,030 | A | * | 6/1994 | Hubbard | A21B 5/03 219/385 |
| 5,441,755 | A | * | 8/1995 | Haggstrom | A21B 5/03 426/496 |
| 5,481,963 | A | * | 1/1996 | Sesona | A21B 5/03 99/335 |
| 5,634,679 | A | * | 6/1997 | Hilderbrandt | A47J 43/283 294/8 |
| 5,642,659 | A | * | 7/1997 | Sesona | A47J 37/0611 99/376 |
| 5,687,640 | A | * | 11/1997 | Sala | A21B 5/03 99/353 |
| 7,421,943 | B1 | * | 9/2008 | Temesgen | A21B 5/00 198/468.6 |
| 2011/0268840 | A1 | * | 11/2011 | McDonnell | A21B 5/00 426/19 |
| 2015/0164088 | A1 | * | 6/2015 | Polashaev | A47J 37/046 426/523 |
| 2016/0015210 | A1 | * | 1/2016 | Valenzuela | A47J 37/067 99/325 |

* cited by examiner

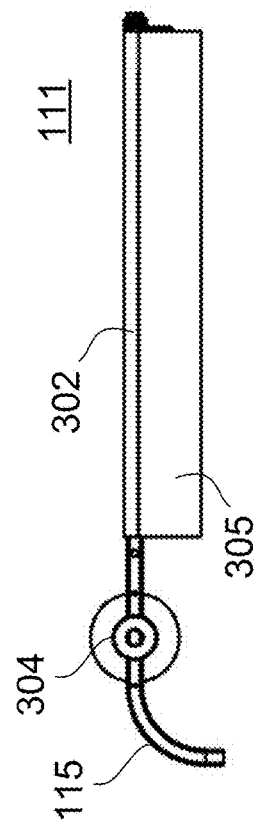
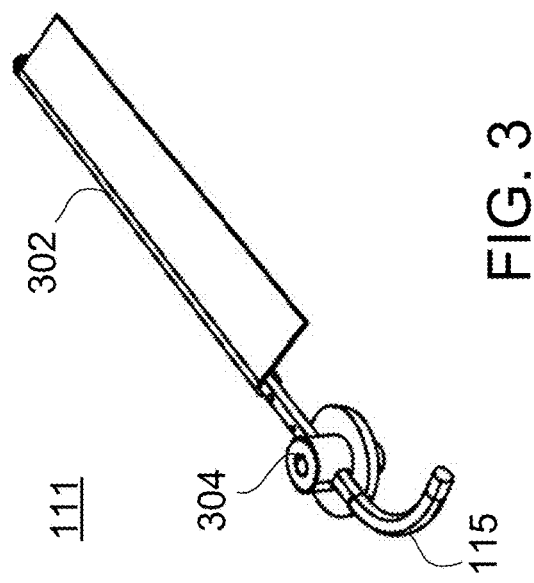
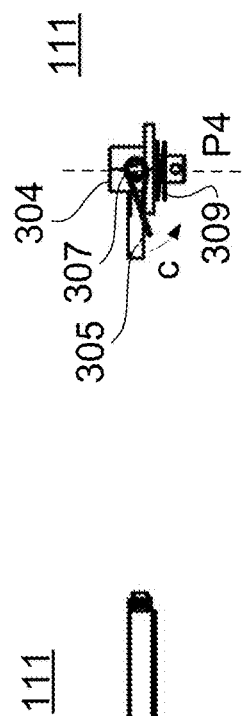
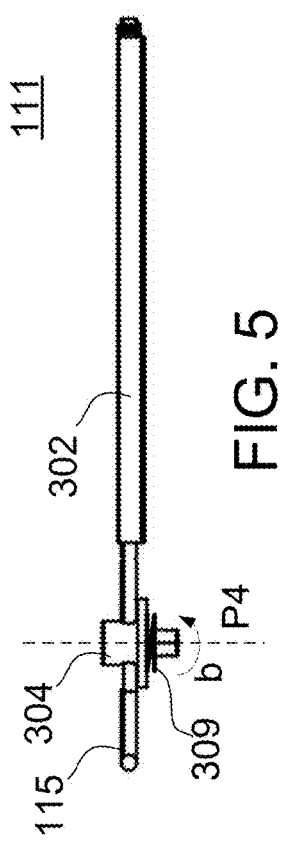
FIG. 3
FIG. 4
FIG. 5
FIG. 6

PANCAKE MAKER APPARATUS, METHODS AND SYSTEMS

CROSS-REFERENCE TO RELATED APPLICATION

The present application incorporates herein by reference each of: U.S. nonprovisional patent application Ser. No. 14/556,777, filed Dec. 1, 2014; U.S. provisional patent application 61/911,996, filed Dec. 4, 2013; and U.S. provisional patent application 62/016,068, filed Jun. 23, 2014. The disclosure of the '068 provisional patent application is contained in the Appendix, which also is incorporated herein by reference.

COPYRIGHT STATEMENT

All of the material in this patent document, including source code, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

COMPUTER PROGRAM LISTING

Submitted concurrently herewith via the electronic filing system of the U.S. Patent & Trademark Office, and incorporated herein by reference, is a computer program listing for computer file(s), one of which represents an eDrawing of components of a preferred embodiment of a prototype in accordance with one or more aspects and features of the present invention; and another of which represents a video clip of operation of such a prototype. A table setting forth the name and size of each file included in the computer program listing is included in the table below.

| File Name | Creation Date | Size in Bytes | Description |
|---|---|---|---|
| ASCIFY.TXT | Jun. 26, 2017 13:04 | 37,473 | assembly source code |
| EDRAWING.TXT | Jun. 26, 2017 13:04 | 8,807,435 | eDrawing |
| PANCAKE.TXT | Jun. 26, 2017 13:04 | 22,356,398 | video (.avi format) |
| README.TXT | Jun. 26, 2017 13:04 | 2,920 | instructions |

The "README.TXT" file contains instructions for utilizing "ASCIFY.TXT" to convert 7"EDRAWING.TXT" AND "PANCAKE.TXT" to compressed .zip files. The compressed files include an eDrawing file and a video file for Windows Media Player. The target system requirements for viewing these files comprise a personal computer running a Microsoft Windows™ operating system, such as Windows XP or Windows 7.

BACKGROUND OF THE INVENTION

The present invention generally relates to apparatus, methods and systems for automatically cooking food and, in particular, to apparatus, methods and systems for making pancakes.

Several pancake making machines are known to exist. For instance, the following patent references disclose pancake making machines and similar apparatus: U.S. Pat. Nos. 5,642,659, 5,481,963, 5,441,755, 3,978,781, 3,814,006, 3,215,062, and 1,869,539; U.S. Patent Application Publication No. 2005/0072311 A1; and EP Patent Nos. 1 520 474 A1, and 1 530 903 B1.

It is believed that known pancake making machines are designed for commercial use such as in restaurants and hotels, and that a need exists for an economical and efficient design aimed at making a less expensive pancake making machine for home use.

In view of the foregoing, it is believed that one or more pancake maker apparatus, methods and systems in accordance with one or more aspects and features of the present invention address such need for a less expensive pancake making machine for home use.

SUMMARY OF THE INVENTION

The present invention includes many aspects and features. Moreover, while many aspects and features relate to, and are described in, the context of pancake machines for home use, it will be understood that the present invention is not limited to such use only, and embodiments incorporating one or more aspects and features of the present invention certainly may be utilized for commercial use.

Accordingly, in an aspect of the present invention, a cooking apparatus comprises: first and second griddles, each comprising a generally planar cooking surface for cooking food; a first lifting mechanism configured to elevate a first side of the first griddle relative to an opposite second side of the first griddle such that a food item on the cooking surface of the first griddle is predisposed to fall onto the cooking surface of the second griddle; and a first wiper configured to sweep the cooking surface of the first griddle to facilitate detachment of any food item attached to the cooking surface of the first griddle and transfer such food item to the cooking surface of the second griddle. The first and second griddles, first lifting mechanism, and first wiper are interconnected preferably to form a portable, integrated cooking product.

In a feature, the first and second griddles, first lifting mechanism, and first wiper are interconnected by a framework or chassis that comprises a base. These components preferably are enclosed within a housing for presenting a refined consumer product for use in a home kitchen and arranged so as to define a compact volume and footprint for use on a table top or countertop.

In a feature, the first griddle is configured to rotate about a first pivot axis in a first direction, and the second griddle is configured to rotate about a second pivot axis in a second direction, the first pivot axis extending in a direction that is generally orthogonal to the direction in which the second pivot axis extends. In an alternative feature, the first pivot axis and the second pivot axis extend generally in parallel to each other.

In a feature, the first wiper comprises a blade. The blade preferably is spring-biased into direct and constant engagement with the generally planar cooking surface of the first griddle, and the first wiper preferably is spring-biased into a standby position in which the first blade of the wiper extends along a side of the first griddle.

In a feature, the first griddle may be supported at an elevation that is above an elevation of the second griddle when the first and second griddles are in generally horizontal positions for cooking food.

In a feature, the first wiper is mounted to the first griddle and is configured to pivot from a first position to a second position and, in so pivoting, is configured to sweep a majority of the area of the cooking surface of the first griddle. In this respect, the first wiper preferably is configured to pivot from the first position to the second position during lifting of the first griddle by the first lifting mechanism so that the sweeping by the first wiper is coordinated with the positioning of the first griddle for transfer of the food item from the first griddle to the second griddle.

In a feature, the first lifting mechanism is configured to elevate the first side of the first griddle relative to the opposite, second side of the first griddle such that the cooking surface of the first griddle at least partially extends over the cooking surface of the second griddle. In this respect, the first griddle may fold over to an almost horizontal position over the second griddle and, preferably, rotates to an angle of at least 120 degrees from the generally horizontal position of the first griddle.

In a feature, the first lifting mechanism comprises a gearbox and motor assembly and an arm linkage assembly. In an alternative of this feature, the first lifting mechanism comprises a lever for manual operation by hand.

In a feature, the apparatus further comprises a dispensing mechanism for dispensing food onto the cooking surface of the first griddle, the dispensing assembly being interconnected with the first and second griddles, first lifting mechanism, and first wiper. The dispensing assembly preferably comprises a controller for actuating dispensing of food onto the cooking surface of the griddle, the controller preferably actuates a motor that drives dispensing of food, and the controller preferably is configured to actuate dispensing of food onto the cooking surface of the first griddle at predetermined intervals of time. When the apparatus is used for cooking pancakes or the like, the dispensing assembly may comprise a hopper for containing batter and a support structure for positioning the hopper over the cooking surface of the first griddle for dispensing batter directly onto the cooking surface of the first griddle.

In another feature, the apparatus further comprises a first heating mechanism located under the first griddle and a second heating mechanism located under the second griddle, the first and second heating mechanisms being interconnected with the first and second griddles, first lifting mechanism, and first wiper. Preferably, the first lifting mechanism is not configured to elevate the first heating mechanism when elevating the first griddle. Alternatively, the first heating mechanism is integral with the first griddle and moves therewith.

In another feature, the cooking apparatus further comprises a guide member that is engaged by the first wiper during movement of the first griddle by the first lifting mechanism, which engagement causes the first wiper to sweep the cooking surface of the first griddle during movement of the first griddle by the first lifting mechanism. The guide member may comprise a rail with an inclined portion of the rail being engaged by the first wiper during downward pivoting movement of the first griddle.

In another feature, the cooking apparatus further comprises a second lifting mechanism configured to elevate a first side of the second griddle relative to an opposite second side of the second griddle such that a food item on the cooking surface of the second griddle is predisposed to fall off of the cooking surface of the second griddle. The cooking apparatus further may comprise a second wiper configured to sweep the generally planar cooking surface of the second griddle to facilitate detachment of any food item attached to the cooking surface of the second griddle and transfer such food item from the cooking surface of the second griddle. The second wiper may be mounted to the second griddle and may be configured to pivot from a first position to a second position and, in so pivoting, sweep a majority of the area of the cooking surface of the second griddle. Furthermore, the second wiper may be configured to pivot from the first position to the second position during lifting of the second griddle by the second lifting mechanism.

In further respect to this feature, the cooking apparatus further may comprise a guide member that is engaged by the second wiper during movement of the second griddle by the second lifting mechanism, which engagement causes the second wiper to sweep the cooking surface of the second griddle during movement of the second griddle by the second lifting mechanism. The second member may comprise a rail having an inclined portion that is engaged by the second wiper during upward pivoting movement of the second griddle. Moreover, other alternatives to a rail in respect to this feature are disclosed below.

In further respect to this feature, the cooking apparatus further may comprise a first heating mechanism located under the first griddle and a second heating mechanism located under the second griddle, the first lifting mechanism not being configured to elevate the first heating mechanism when elevating the first griddle, and the second lifting mechanism not being configured to elevate the second heating mechanism when elevating the second griddle.

In yet additional features of this aspect, the cooking apparatus is not automated and includes manual operation of one or more lifting mechanisms and, preferably, operation of a lifting mechanism and associated wiper by manually operating a lever.

In yet another feature of this aspect, the cooking apparatus further comprises a manual control knob that is rotatable for actuating the dispensing of food onto the cooking surface of the griddle.

In yet another feature of this aspect, the cooking apparatus further comprises a hopper and a support for receiving and supporting the hopper over the griddle. The hopper may be removably received within and rest upon the support.

Additionally, the cooking apparatus may further comprise a housing cover that generally encloses the griddle, and the hopper support may be formed in the housing cover. In such case, the housing cover is hingedly attached to a housing of the cooking apparatus for pivotal movement between a closed position, in which the housing cover generally encloses the griddles, and an open position, in which the griddles are generally accessible for manual cleaning. Alternatively, the housing cover may be removably attached to the housing for accomplishing the same purpose.

In another aspect of the invention, a cooking apparatus preferably used for making pancakes comprises: first and second griddles for cooking opposite sides of a pancake, each comprising a generally planar cooking surface having an area for cooking a single pancake; a first lifting mechanism configured to elevate a first side of the first griddle relative to an opposite second side of the first griddle such that a pancake on the cooking surface of the first griddle is predisposed to fall onto the cooking surface of the second griddle resulting in a flipping of the pancake being cooked; a first wiper mounted to the first griddle for pivoting movement relative thereto and configured to sweep the area of the cooking surface of the first griddle for cooking the single pancake in order to facilitate detachment of any pancake that is attached to the cooking surface of the first griddle and transfer such pancake to the cooking surface of the second griddle; a second lifting mechanism configured to elevate a first side of the second griddle relative to an opposite second side of the second griddle such that a pancake on the cooking surface of the second griddle is predisposed to fall off of the cooking surface of the second griddle; and a second wiper mounted to the second griddle for pivoting movement relative thereto and configured to sweep the area of the cooking surface of the second griddle in order to facilitate detachment of any pancake that is attached to the cooking surface of the second griddle and transfer such pancake from the cooking surface of the second griddle. Preferably, the second wiper is configured to pivot from a first position to a second position and, in so pivoting, sweep a majority of the area of the cooking surface of the second griddle. The first and second griddles, first and second lifting mechanisms, and first and second wipers are interconnected.

In a feature, the first and second griddles, the first and second lifting mechanisms, and the first and second wipers are interconnected by a framework or chassis that comprises a base. These components preferably are enclosed within a housing for presenting a refined consumer product for use in a home kitchen and are arranged so as to define a compact volume and footprint.

In a feature, the first griddle is configured to rotate about a first pivot axis in a first direction, and the second griddle is configured to rotate about a second pivot axis in a second direction, the first pivot axis extending in a direction that is generally orthogonal to the direction in which the second pivot axis extends. In an alternative, the first pivot axis and the second pivot axis extend generally in parallel to each other, with the griddles rotating in-line with each other.

In a feature, a blade of the first wiper is biased into direct and constant engagement with the generally planar cooking surface of the first griddle and a blade of the second wiper is biased into direct and constant engagement with the generally planar cooking surface of the second griddle.

In a feature, the first wiper is biased into a standby position in which the first wiper extends adjacent a side of the first griddle, and the second wiper is biased into a standby position in which the second wiper extends adjacent a side of the second griddle.

In a feature, the first griddle is supported at an elevation that is above an elevation of the second griddle when the first griddle and the second griddle are in generally horizontal positions for cooking a side of a pancake.

In a feature, the first lifting mechanism is configured to elevate the first side of the first griddle relative to the opposite, second side of the first griddle such that the cooking surface of the first griddle at least partially extends over the cooking surface of the second griddle.

In a feature, the cooking apparatus further comprises a dispensing mechanism for dispensing food onto the cooking surface of the first griddle, the dispensing assembly being interconnected with the first and second griddles, first and second lifting mechanisms, and the first and second wipers. The dispensing assembly preferably comprises a controller for actuating dispensing of batter onto the cooking surface of the first griddle at predetermined intervals of time or upon demand by a user.

In a feature, the cooking apparatus further comprises a first heating mechanism located under the first griddle and a second heating mechanism located under the second griddle, the first and second heating mechanisms being interconnected with the first and second griddles, first lifting mechanism, and first wiper, the first lifting mechanism not being configured to elevate the first heating mechanism when elevating the first griddle.

In another feature, the cooking apparatus further comprises a first guide member that is engaged by the first wiper during pivoting movement of the first griddle by the first lifting mechanism, which engagement causes the first wiper to sweep the cooking surface of the first griddle during movement of the first griddle by the first lifting mechanism; and a second guide member that is engaged by the second wiper during pivoting movement of the second griddle by the second lifting mechanism, which engagement causes the second wiper to sweep the cooking surface of the second griddle during movement of the second griddle by the second lifting mechanism.

In further regard to this feature, the first guide member may comprise a first rail having an inclined portion that is engaged by the first wiper during downward pivoting movement of the first griddle, and the second guide member may comprise a second rail having an inclined portion that is engaged by the second wiper during upward pivoting movement of the second griddle. Alternatively, each guide member may comprise a slot, channel, or other guiding structure.

In another aspect, a method of making pancakes comprises the steps of: dispensing pancake batter onto a cooking surface of a first griddle in an amount to make a pancake; cooking a first side of the pancake on the first griddle cooking surface; inverting the first griddle such that at least a portion of the first griddle cooking surface extends over a cooking surface of a second griddle; sweeping the first griddle cooking surface to facilitate transfer of the pancake cooking on the first griddle cooking surface to the second griddle cooking surface resulting in flipping of the pancake for cooking of a second side of the pancake on the second griddle cooking surface; raising one side of the second griddle relative to an opposite side of the second griddle so as to predispose the pancake cooking on the cooking surface of the second griddle to fall from the cooking surface of the second griddle; and sweeping the second griddle cooking surface to facilitate fall of the pancake cooking on the cooking surface of the second griddle from the cooking surface of the second griddle.

In a feature of this aspect, a serving plate is used to receive the pancake from the second griddle. In alternatives, a platform or board, such as a fold out door of a body of the cooking apparatus, is used to receive the pancake rather than a serving plate.

In a feature of this aspect, the steps are automated and performed by a cooking apparatus. In alternatives, one or more steps are manually performed by hand. Alternatively, one or more steps may be manually performed, such as by manual operation of a lever, for example.

In another aspect, a system for making pancakes comprises providing a cooking apparatus comprising first and second griddles for cooking opposite sides of a pancake, each comprising a generally planar cooking surface having an area for cooking a single pancake; a first lifting mechanism configured to elevate a first side of the first griddle relative to an opposite second side of the first griddle such that a pancake on the cooking surface of the first griddle is predisposed to fall onto the cooking surface of the second griddle resulting in a flipping of the pancake being cooked; a first wiper mounted to the first griddle for pivoting movement relative thereto and configured to sweep the area of the cooking surface of the first griddle for cooking the single pancake in order to facilitate detachment of any pancake that is attached to the cooking surface of the first griddle and transfer such pancake to the cooking surface of the second griddle; a second lifting mechanism configured to elevate a first side of the second griddle relative to an opposite second side of the second griddle such that a pancake on the cooking surface of the second griddle is predisposed to fall off of the cooking surface of the second griddle; and a second wiper mounted to the second griddle for pivoting movement relative thereto and configured to sweep the area of the cooking surface of the second griddle for cooking the single pancake in order to facilitate detachment of any pancake that is attached to the cooking surface of the second griddle and transfer such pancake from the cooking surface of the second griddle. Preferably, the second wiper is configured to pivot from a first position to a second position and, in so pivoting, sweep a majority of the area of the cooking surface of the second griddle.

The system further comprises dispensing pancake batter onto the cooking surface of the first griddle in an amount to make a pancake; cooking a first side of the pancake on the first griddle cooking surface; inverting the first griddle using the first lifting mechanism such that at least a portion of the first griddle cooking surface extends over the cooking surface of the second griddle; sweeping the first griddle cooking surface with the first wiper to facilitate transfer of the pancake cooking on the first griddle cooking surface to the second griddle cooking surface resulting in flipping of the pancake for cooking of a second side of the pancake on the second griddle cooking surface; elevating one side of the second griddle relative to the opposite side of the second griddle using the second lifting mechanism so as to predispose the pancake cooking on the cooking surface of the second griddle to fall from the cooking surface of the second griddle; and sweeping the second griddle cooking surface using the second wiper to facilitate fall of the pancake cooking on the cooking surface of the second griddle from the cooking surface of the second griddle.

In another aspect, an automated cooking apparatus comprises: first and second griddles, each comprising a generally planar cooking surface for cooking food; a first lifting mechanism configured to elevate a first side of the first griddle relative to an opposite second side of the first griddle such that a food item on the cooking surface of the first griddle falls onto the cooking surface of the second griddle; and a second lifting mechanism configured to elevate a first side of the second griddle relative to an opposite second side of the second griddle such that a pancake on the cooking surface of the second griddle falls off of the cooking surface of the second griddle for transfer to, for example, a serving plate, platform, or board. The first and second griddles and first and second lifting mechanisms are interconnected and define an integrated cooking device Other aspects comprise methods of manufacturing cooking apparatus in accordance with one or more aspects and features of the invention.

Still additional aspects and features are disclosed in the computer program listing, which is incorporated herein by reference.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals.

FIG. 3 schematically illustrates a perspective view of an exemplary wiper of the embodiment of FIG. 1.

FIG. 4 schematically illustrates a top plan view of the exemplary wiper of FIG. 3.

FIG. 5 schematically illustrates an elevational view of the exemplary wiper of FIG. 3.

FIG. 6 schematically illustrates another elevational view of the exemplary wiper of FIG. 3 which view is generally orthogonal to the view of FIG. 5.

DETAILED DESCRIPTION

Figure 1:
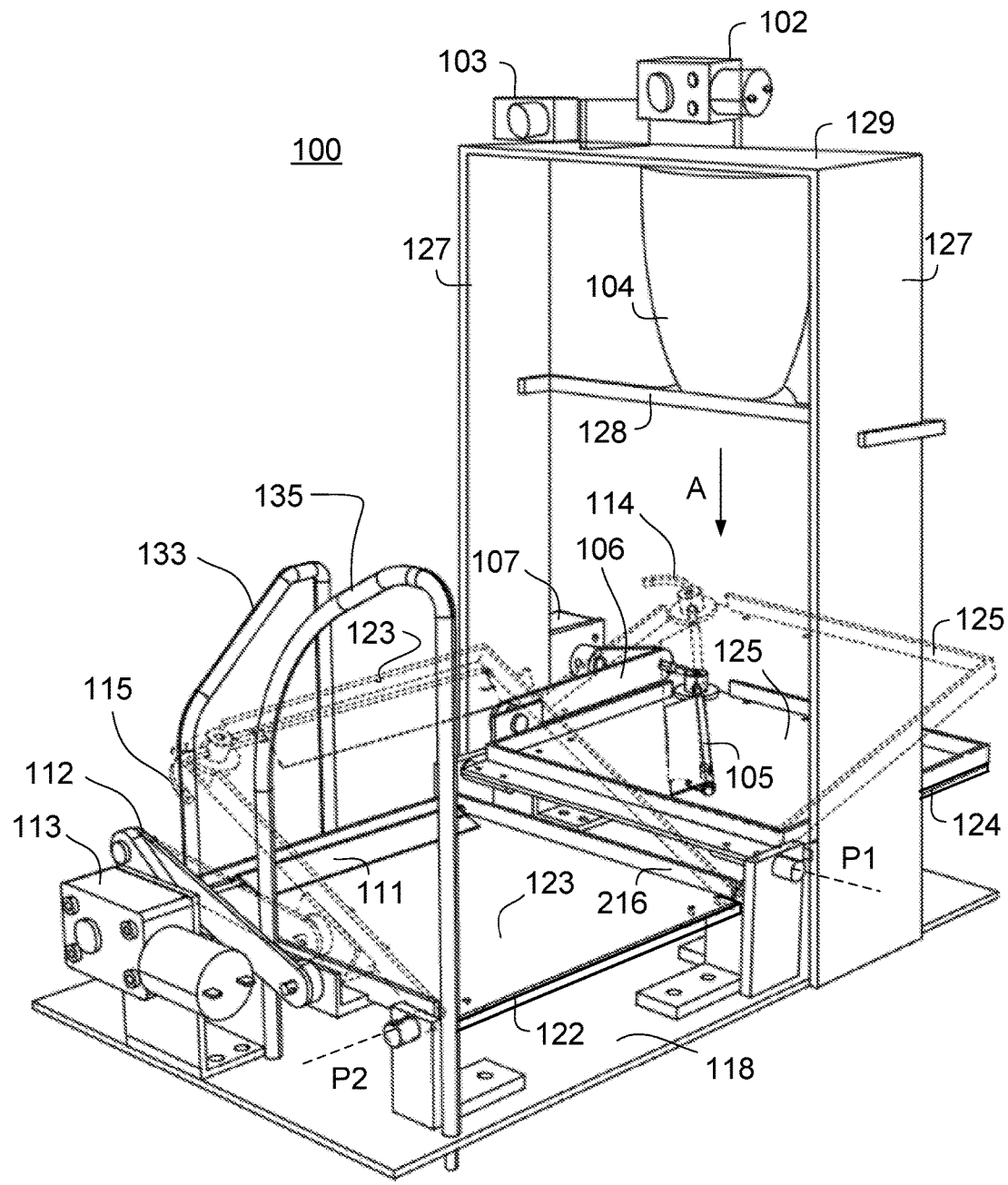
FIG. 1 schematically illustrates a perspective view of components of a preferred embodiment of a prototype pancake maker apparatus in accordance with one or more aspects and features of the present invention.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purpose of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With respect to the United States, and regarding applicability of 35 U.S.C. § 112(f), no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

An embodiment 100 of a pancake maker apparatus in accordance with one or more aspects and features of the present invention is schematically illustrated in perspective view in FIG. 1. As shown therein, a mix hopper 104 for containing pancake batter is retained at an elevated position over a griddle 125.

The mix hopper 104 is maintained in the elevated position by vertical wall supports 127 that extend upwardly from a base plate 118. A horizontal frame member 128 spans the vertical walls 127. A top shelf 129 also spans the vertical walls 127. A gearbox and motor assembly 102 supported by the top shelf 129 drives a cam that engages a rod inside the mix hopper 104. Moreover, while shown in the drawings as being located adjacent a side of the griddle 125, the gearbox and motor assembly 102 may be located under the griddle 125 to provide a more compact arrangement. The gearbox and motor assembly 102 is actuated by a controller 103 that is configured to cause a predetermined amount of pancake batter to be dispensed at a predetermined time or predetermined time interval downwardly in the direction of arrow A onto a griddle 125.

The griddle 125 also is secured to and is supported on the base plate 118 by L-shaped brackets. The griddle 125 is configured to pivot about axis P1 of hinge pins 212 (shown in FIG. 2) from an originally horizontal orientation to an obtuse angle. Rotation of griddle 125 is driven by a gearbox and motor assembly 107 comprising gearbox 209 and motor 208 (shown in FIG. 2), which are connected to the griddle 125 by a linkage arm assembly 107 comprising lever arms 206,207 connected to the griddle 125 by clevis pin 210 and bracket 211. An intermediate position of the griddle 125 during rotation is represented by griddle 125 shown in dashed lines in FIG. 1.

The embodiment 100 further includes a second griddle 123 similar in size and shape to the first griddle 125 that also is secured to and is supported on the base plate 118 by L-shaped brackets. The second griddle 123 is configured to pivot about axis P2 of hinge pins from an originally horizontal orientation to an obtuse angle. Rotation of griddle 123 is driven by gearbox and motor assembly 113 similar to that of gearbox and motor assembly 107 and linkage arm assembly 112, and an intermediate position of the griddle 123 during rotation is represented by griddle 123 shown in dashed lines in FIG. 1. Moreover, while shown in the drawings as being located adjacent a side of the griddle 123, the gearbox and motor assembly 113 may be located under the griddle 123 to provide a more compact arrangement.

In some contemplated embodiments, the griddle 123 is rotated to an inverted position (rotated greater than 90 degrees) such that the griddle 123 at least partially extends beyond an edge of the base plate 118 vertically over a serving plate that may be positioned to receive a cooked pancake. Indeed, the griddle 123 may be rotated beyond 90 degrees to nearly 180 degrees, causing the second griddle to project substantially from the remainder of the cooking apparatus. Preferably, however, the griddle 123 rotates to no more than around 90 degrees and remains within a body of the cooking apparatus for a more compact arrangement.

As shown, a first axis P1 extends in a direction that is generally orthogonal to the direction in which a second axis P2 extends, although in contemplated alternatives, the griddles are arranged in-line with the first and second axes extending in parallel. Furthermore, as shown, griddle 125 is supported above the base plate 118 at a greater distance, i.e., higher elevation, than that of griddle 123. Griddle 125 also is oriented such that, when rotated into a fully extended position, griddle 125 extends over griddle 123.

A heating plate is provided under each griddle for heating the cooking surface of the griddle. Preferably, each heating plate is not secured to its respective griddle and does not rotate with the griddle. Heating plate 122 is positioned under griddle 123, and heating plate 124 is positioned under griddle 125. In alternative embodiments, the heating element is secured to the griddle and rotates with the griddle.

Preferably, a wiper is provided with each griddle. In this respect, wiper 105 is provided with griddle 125 and wiper 111 is provided with griddle 123. Each wiper is configured to sweep the surface of its respective griddle. As shown, in the embodiment 100, each wiper is attached to its respective griddle at one of the four corners of each griddle and further is configured to rotate thereabout when sweeping the griddle surface. Sweeping movement of each wiper is driven by engagement of an arm of the wiper that engages a rail during rotational movement of its respective griddle. Wiper 105 rotates about axis P3 of a hinge pin (illustrated in FIG. 2), and wiper 111 rotates about axis P4 of a hinge pin (also illustrated in FIG. 2). When the griddles 123,125 are in their respective horizontal positions, the axes P3, P4 preferably extend in parallel directions.

During its rotational movement, arm 114 of wiper 105 engages rail 133—and specifically at a point during a downward arc of its rotational movement, causing arm 114 to rotate about an axis and wiper 105 to sweep the cooking surface of the griddle 125 while the griddle 125 continues to rotate thereafter. The point of engagement of the arm 114 with the rail 133 is preferably at an angle of about 100 degrees of the cooking surface of the griddle 125 relative to the cooking surface of the griddle 125 when starting at the horizontal position.

In similar manner, arm 115 of wiper 111 engages rail 135 during its rotational movement—and specifically at a point during an upward arc of its rotational movement, causing arm 115 to rotate about an axis and wiper 111 to sweep the cooking surface of the griddle 123 while the griddle 123 continues to rotate thereafter.

As further disclosed below, each wiper is spring-biased to a standby position at which a length thereof extends adjacent to a side of the griddle, and only undergoes rotational, sweeping movement when its arm engages a side rail during rotational movement of the griddle to which it is attached.

Accordingly, it will be appreciated that the wiper 105 is shown in an intermediate position during its rotational movement across the griddle cooking surface for illustration purposes only, and that at the particular position of the griddle 125 shown in FIG. 1, the arm 114 would not have yet engaged rail 133 so as to cause the wiper to move against the biasing force. Instead, the wiper 105 would remain in the standby position at this point in the rotational movement of the griddle 125 as shown in dashed lines in FIG. 1, similar to wiper 111 shown in the standby position at the particular point in the rotational movement of the griddle 123 as shown in dashed lines in FIG. 1.

Figure 2:
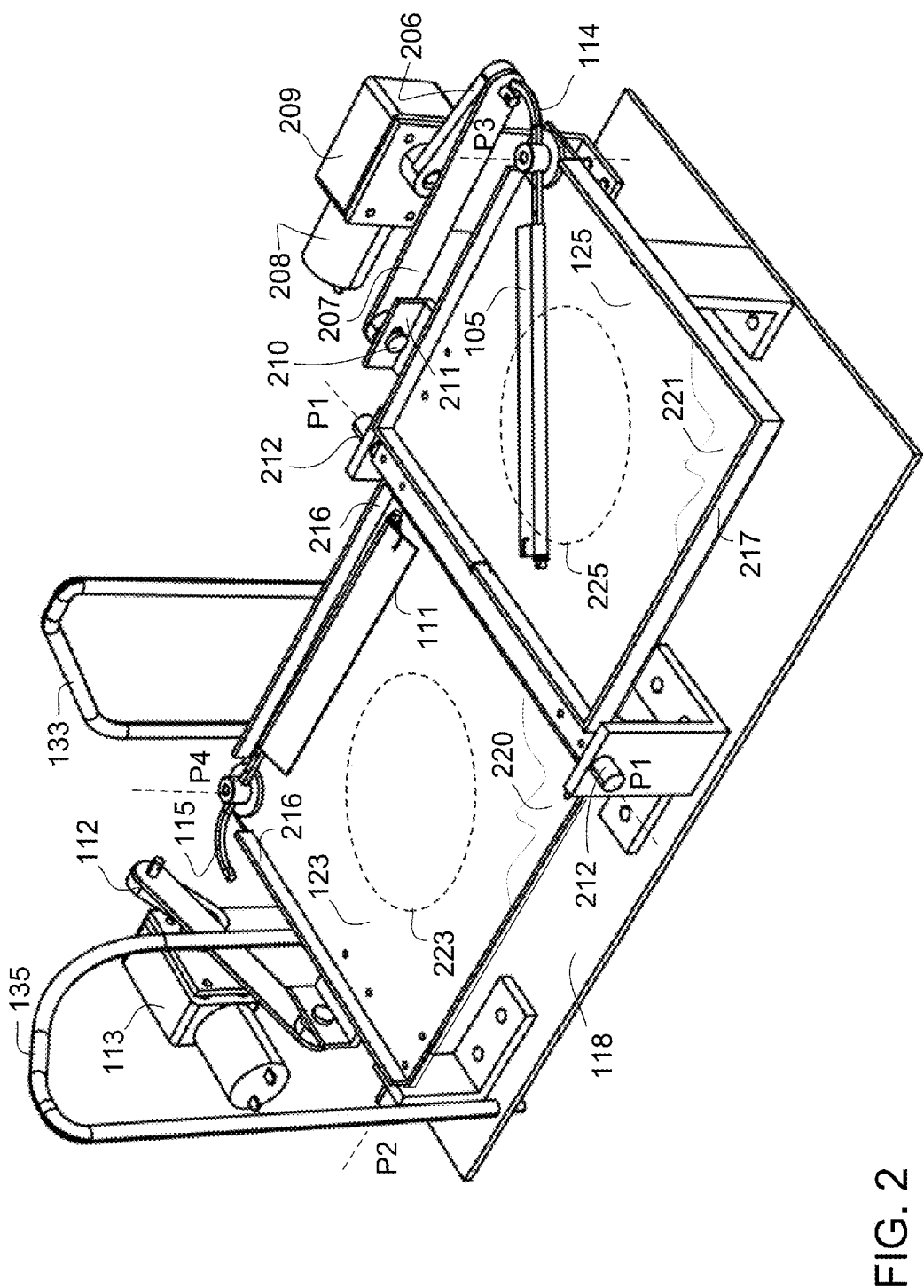
FIG. 2 schematically illustrates a perspective view of components of the embodiment of the pancake maker apparatus of FIG. 1.

The griddles 123,125 and wipers 105,111 illustrated in FIG. 1 are perhaps better seen in FIG. 2, wherein the hopper and associated components have been omitted. Furthermore, it is contemplated within the scope of the invention that the hopper and associated components could be omitted from the embodiment 100 if the pancake batter is to be manually dispensed, whereby automatic cooking and delivery of a pancake to a serving plate may nonetheless still be provided. In other contemplated embodiments, a screw drive or pump and bag are used instead of the cam driven release.

Of course, it will again be appreciated that the wiper 105 is shown in FIG. 2 in an intermediate position during its rotational movement across the griddle cooking surface for illustration purposes only, and that at the particular position of the griddle 125 in the horizontal position as shown in FIG. 2, the arm 114 would not be engaged with rail 133 so as to cause the wiper 105 to move against the force that biases the wiper 105 toward the standby position. For reference, wiper 111 is shown in its respective standby position with respect to griddle 123.

In FIG. 2, griddle 125 is shown with raised edges or walls 217 that extends around a periphery of the griddle 125, and that is designed to stop cooking mix from spilling over the edge of the griddle 125. Similarly, griddle 123 is shown with raised edges or walls 216 that extend around a portion of the periphery of griddle 123. A heat resistant non-stick sheet 221 (partially shown in FIG. 2) is provided with griddle 125, and a heat resistant non-stick sheet 220 (partially shown in FIG. 2) is provided with griddle 123.

The intended approximate position of a pancake to be cooked on each griddle 123,125 is shown in dashed lines 223,225, respectively.

With reference to FIGS. 3-6, wiper 111 is described, the description of which is similarly applicable to wiper 105. As shown in FIGS. 3-6, wiper 111 comprises an extended arm 302 projecting away from a pivot pin 304 and, on an opposite side of the pivot pin 304, the arm 115 which is shorter and curved, and which extends in an opposite direction away from the pivot pin 304. The extended arm 302 is spring-biased by spring 309 in the rotational direction of arrow B (FIG. 5) for positioning of the wiper 111 in the standby position when attached to the griddle. Additionally, the extended arm 302 comprises a blade 305 for sweeping, wiping, and/or scraping the cooking surface of the griddle, which blade is spring-biased by spring 307 in the rotational direction of arrow C (FIG. 6) for tensioned abutment with the cooking surface of the griddle such that the blade is maintained in constant direct contact with the cooking surface.

Preferably, the embodiment 100 also includes a control system with controls for the different aspects of the apparatus required for cooking. The controls preferably are located on an exterior of the apparatus for access and operation by the user. The control system may be automated on single-use settings, and may allow a user to adjust pancake size, the number of pancakes cooked, and a time at which to begin cooking, similar to automated coffee makers. Furthermore, in contemplated embodiments, automated mixing of pancake batter in the hopper assembly is provided. As currently contemplated, the controls preferably will be used to set temperature (heat of the griddles), size of the pancake, and the number of pancakes to be made. In addition, it is contemplated that a warming light may be used to indicate when the griddles are hot and another light to indicate when the hopper requires refilling.

Alternative means for dispensing batter other than a hopper also are contemplated and include use of a peristaltic pump; use of a screw pump (Archimedes screw); use of a compressed bag and roller system; and use of disposable capsules or cups, each containing a predetermined volume of pancake mix.

Figure 7:
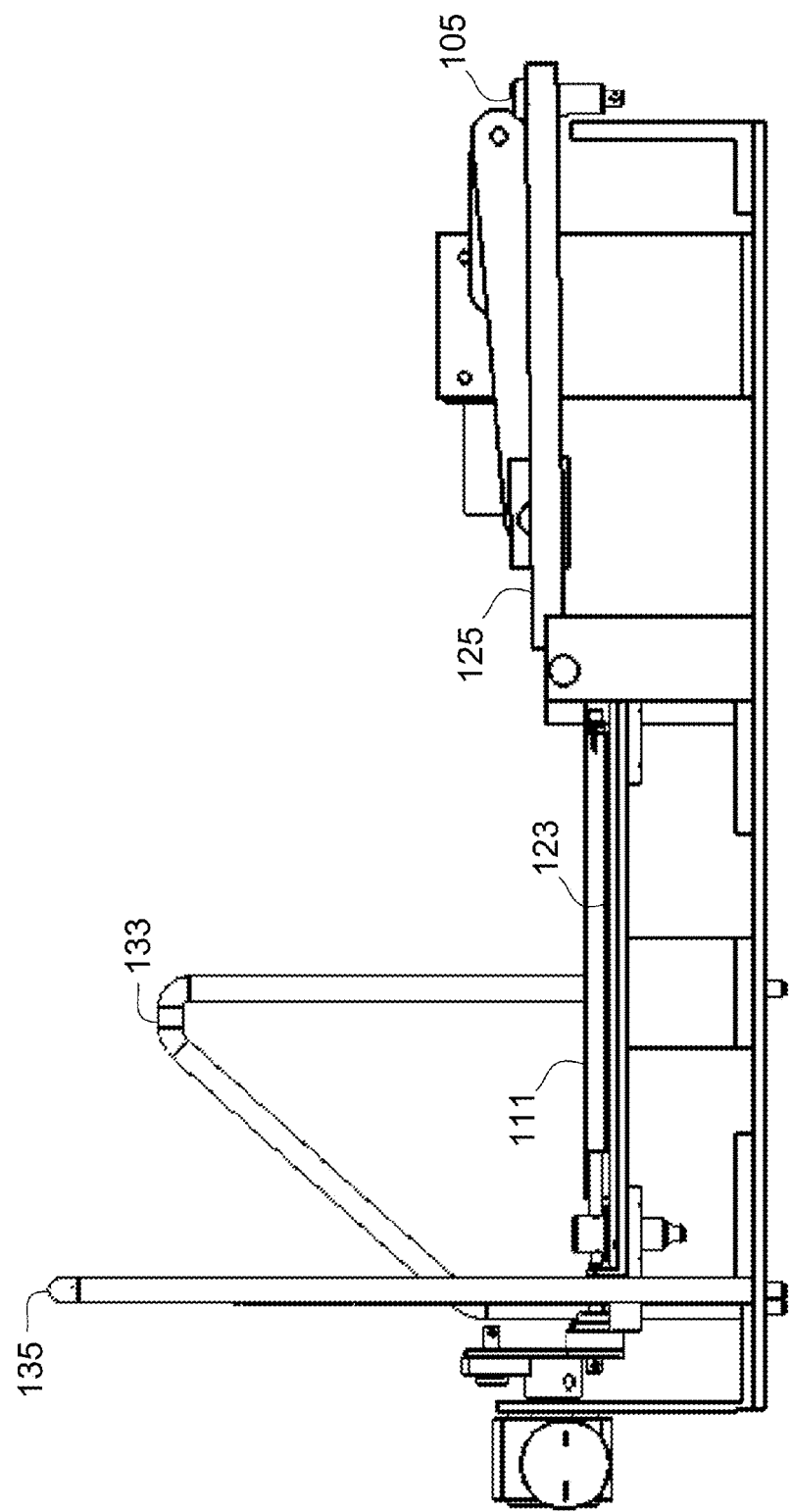
FIG. 7 schematically illustrates an elevational view of the components of FIG. 2.
Figure 8:
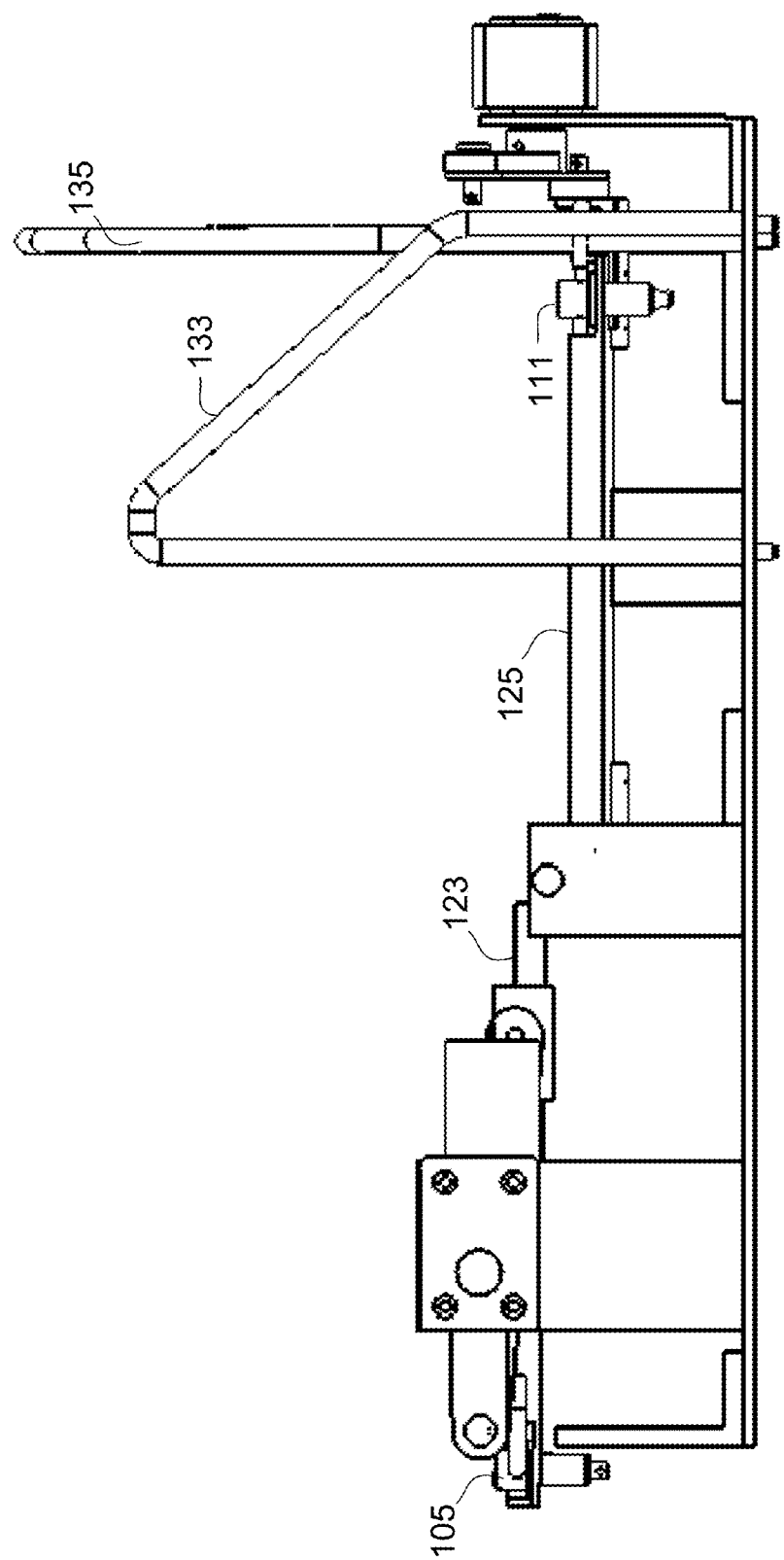
FIG. 8 schematically illustrates an elevational view of the components of FIG. 2, which view is in an opposite direction to the view of FIG. 7.
Figure 9:
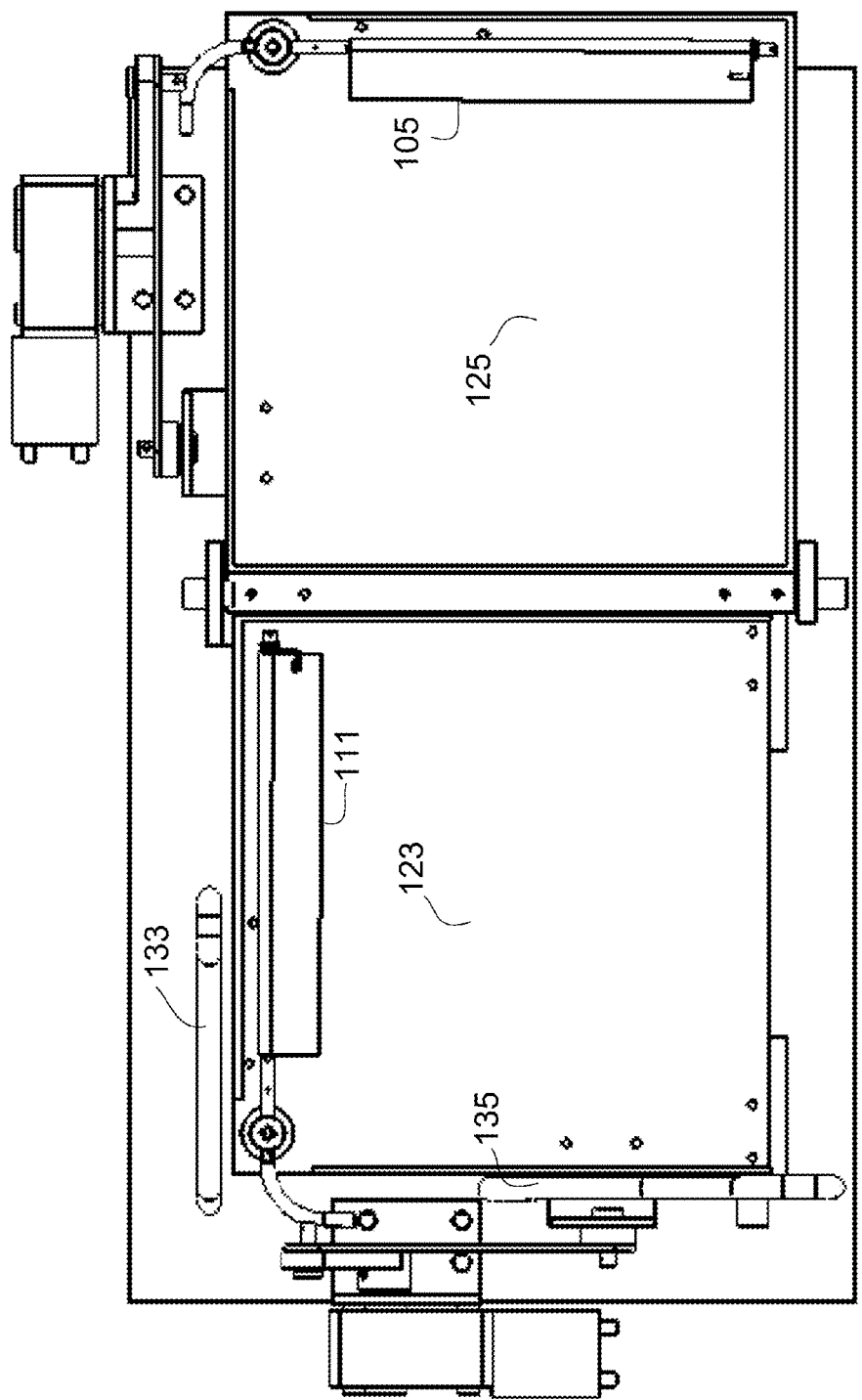
FIG. 9 schematically illustrates a top plan view of the components of FIG. 2.
Figure 10:
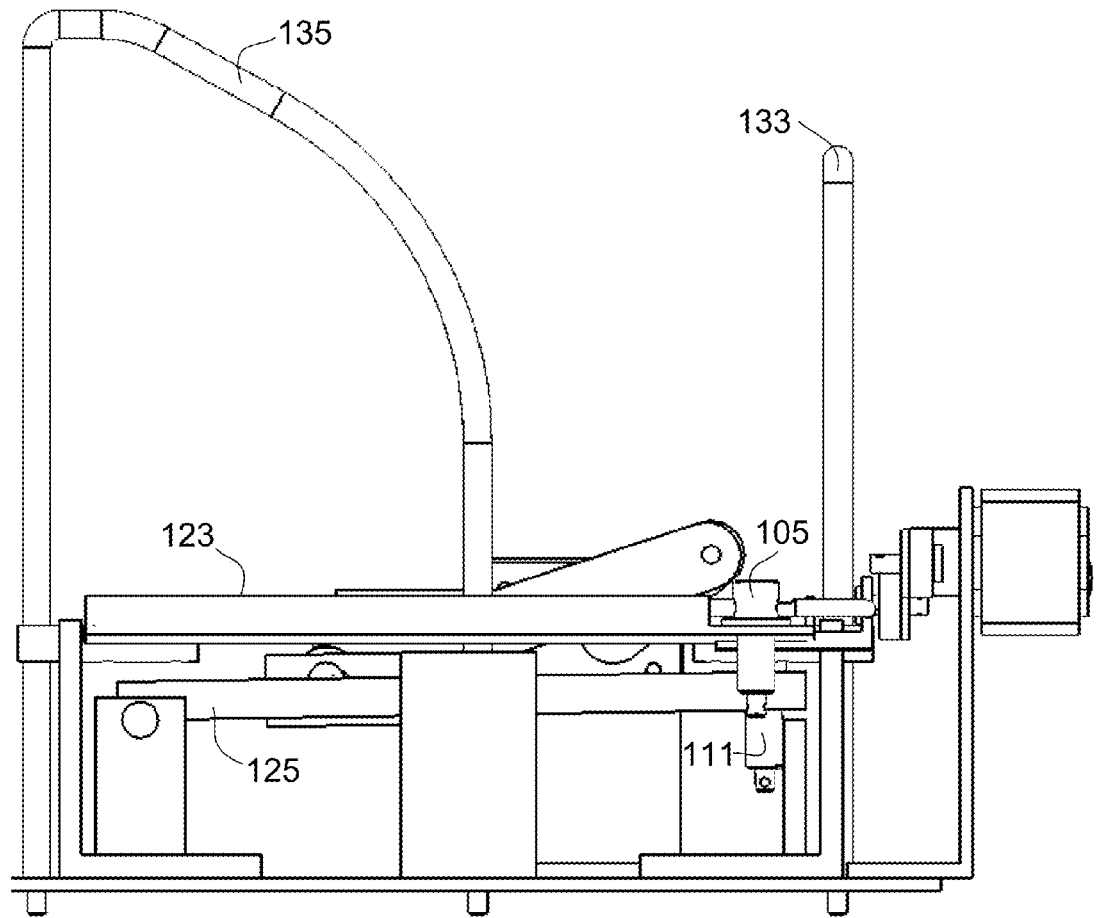
FIG. 10 schematically illustrates an elevational view of the components of FIG. 2, which view is in a direction generally orthogonal to the views of FIGS. 7 and 8.
Figure 11:
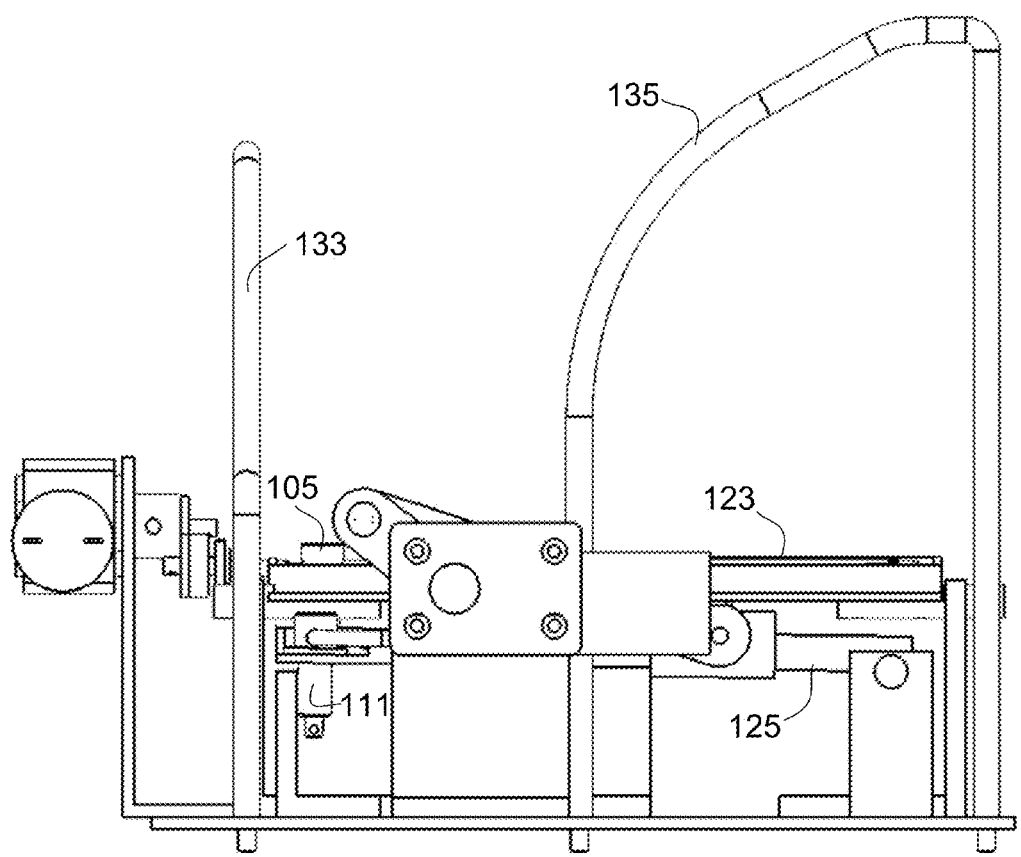
FIG. 11 schematically illustrates an elevational view of the components of FIG. 2, which view is in an opposite direction to the view of FIG. 10.

Additional views of components of the embodiment 100 are shown in FIGS. 7-11. In this regard, FIG. 7 schematically illustrates an elevational view of a front of the components of FIG. 2; FIG. 8 schematically illustrates an elevational view of a rear of the components of FIG. 2; FIG. 9 schematically illustrates a top plan view of the components of FIG. 2; FIG. 10 schematically illustrates an elevational view of a first side of the components of FIG. 2; and FIG. 11 schematically illustrates an elevational view of the other side of the components of FIG. 2.

Further views of components of the embodiment 100 are provided by the eDrawing file of the computer program listing, included herewith and incorporated herein by reference.

Preferably, the major components of the cooking apparatus including the griddles and hopper are readily detached and removed from the apparatus for cleaning in a dishwasher, and most parts may be made of plastic.

Operation of a preferred embodiment of a prototype pancake maker apparatus in accordance with one or more aspects and features of the present invention is shown in the video clip of the computer program listing, included herewith and incorporated herein by reference.

In contrast to the foregoing, other embodiments of cooking apparatus in accordance with one or more aspects and features of the present invention include hand-operated apparatus, in which motors are not used to drive the lifting and wiping of the griddles. Instead, the lifting and wiping is hand-operated by actuating, for example, levers. For example, FIGS. 12-17 illustrate such a hand-operated apparatus.

Figure 12:
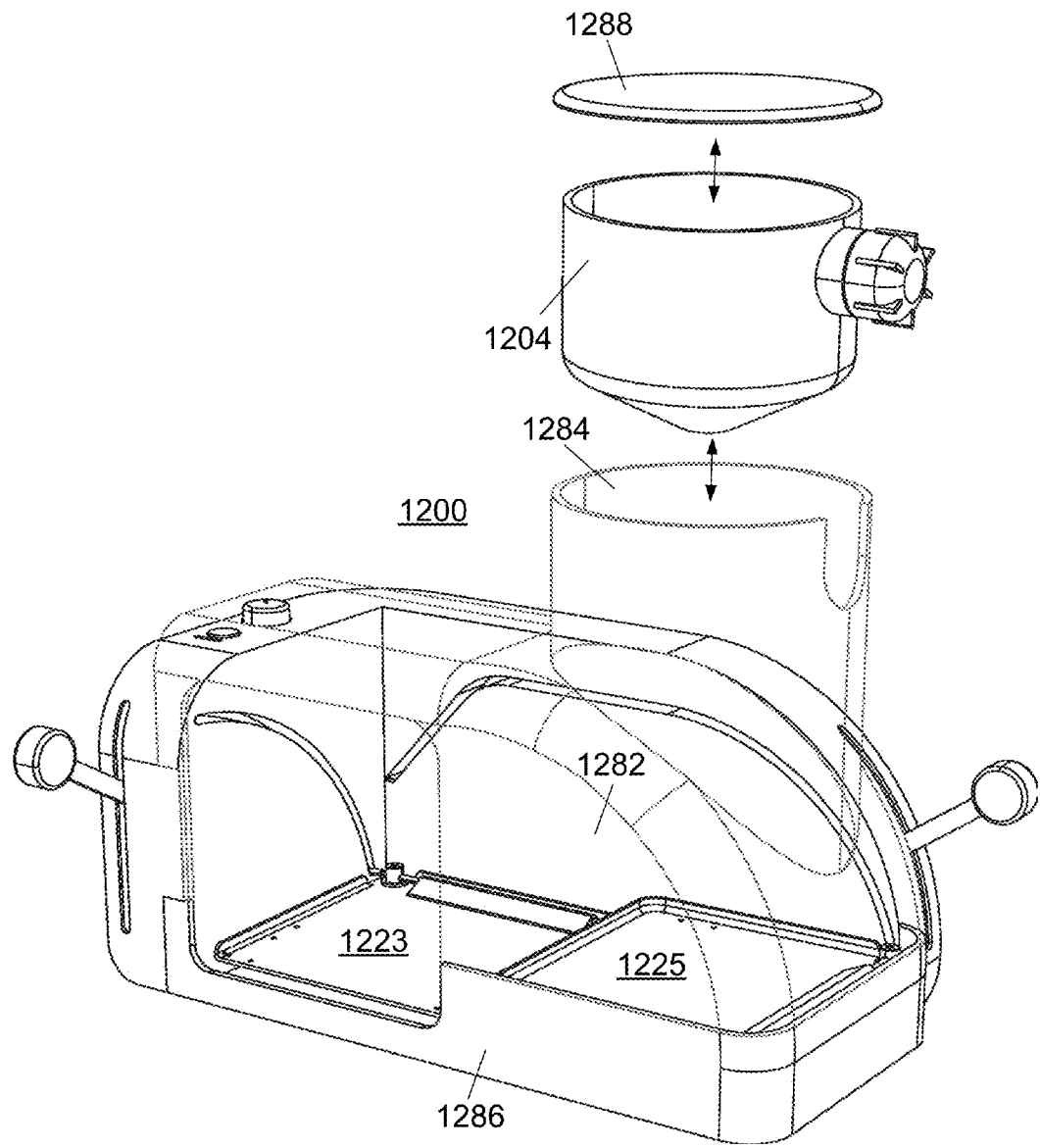
FIG. 12 schematically illustrates a perspective view of another preferred embodiment of a pancake maker apparatus in accordance with one or more aspects and features of the present invention.
Figure 14:
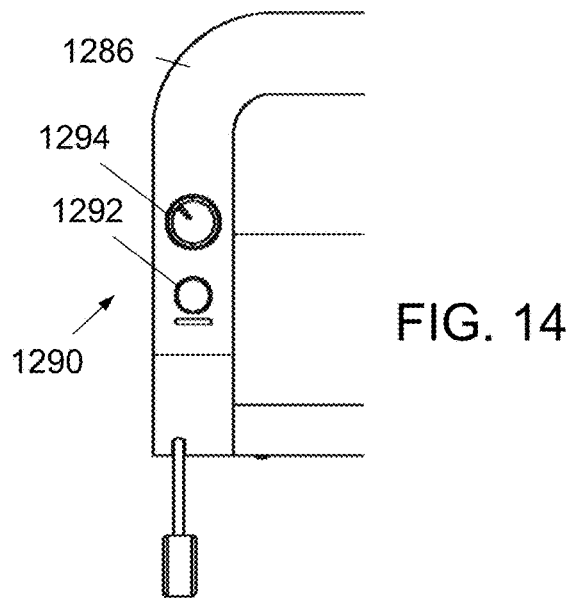
FIG. 14 schematically illustrates a close-up view of user controls that are shown in FIG. 13.
Figure 13:
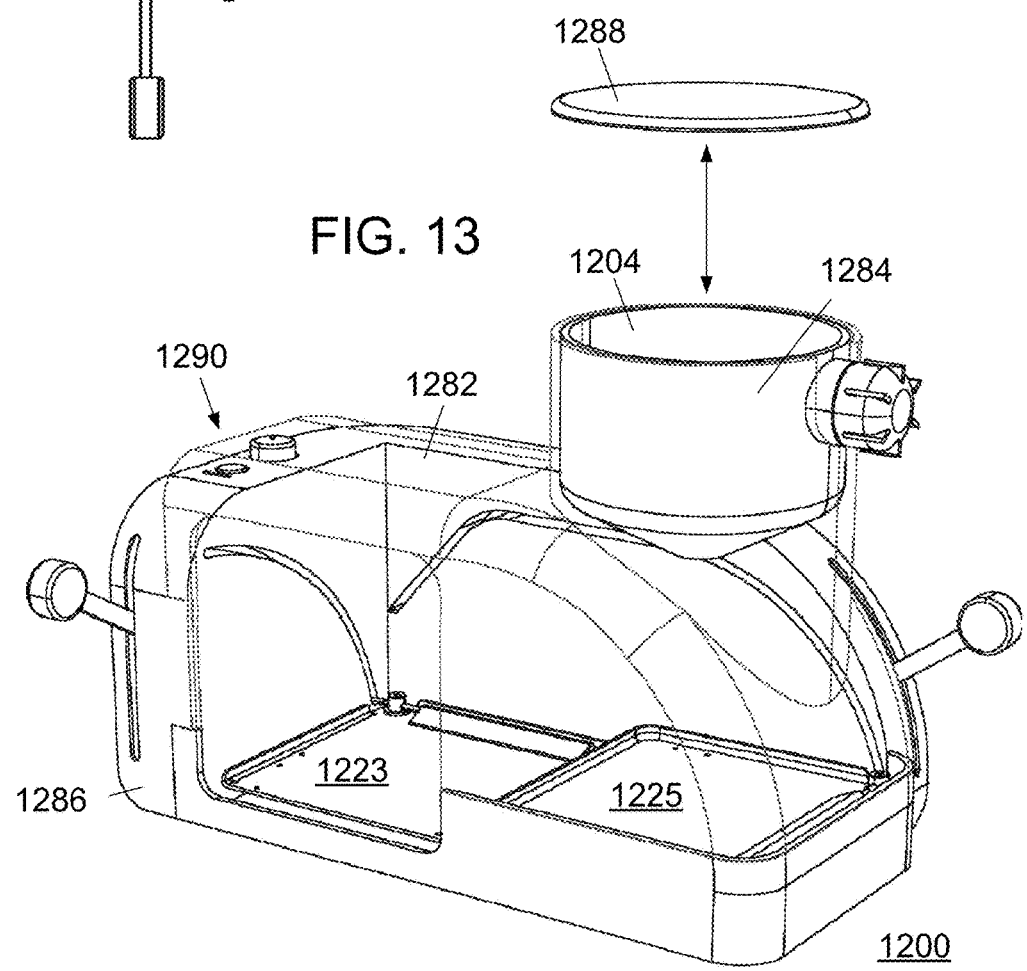
FIG. 13 schematically illustrates another perspective view of the preferred embodiment of a pancake maker apparatus of FIG. 12.

In particular, FIG. 12 schematically illustrates a perspective view of components of a preferred embodiment of a pancake maker apparatus 1200 in accordance with one or more aspects and features of the present invention; FIG. 13 schematically illustrates another perspective view of the pancake maker apparatus 1200; FIG. 14 schematically illustrates a close-up view of user controls shown in FIG. 13; and FIG. 15 schematically illustrates a perspective view of components of the pancake maker apparatus 1200.

Figure 15:
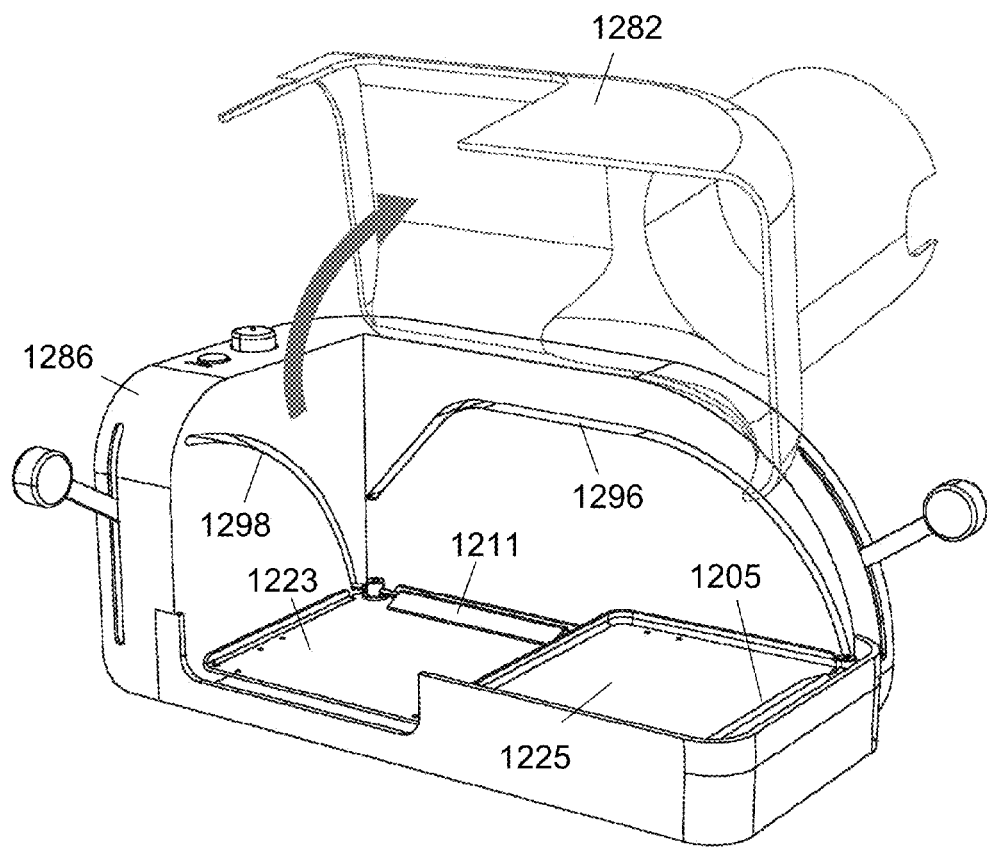
FIG. 15 schematically illustrates another perspective view of components of the pancake maker apparatus of FIG. 12.

As shown in FIGS. 12-15, pancake maker apparatus 1200 includes a hopper 1204 and a housing cover 1282 that forms a support 1284 within which the hopper 1204 is received and supported in disposition over the cooking surface of a first griddle 1225. The hopper 1204 is removably received within and rests on the support 1284. A removable lid 1288 covers the top opening of the hopper 1204. The housing cover 1282 is hingedly attached to a housing 1286 of the apparatus 1200 for pivotal movement between a closed position, in which the housing cover 1282 generally encloses the cooking surface of the first griddle 1225 as well as the cooking surface of a second griddle 1223; and an open position, in which the cooking surfaces of the griddles 1223,1225 are generally accessible for manual cleaning. FIGS. 12 and 13 show the pancake maker apparatus 1200 in the closed position, and FIG. 15 shows the pancake maker apparatus 1200 in the open position. Alternatively, the housing cover may be removably attached to the housing for accomplishing the same purpose. In both scenarios, the housing cover preferably is transparent for viewing of items being cooked on the cooking surfaces when in the closed position.

The housing 1286 preferably includes user controls 1290, including a power button 1292 for turning the pancake maker apparatus 1200 on and off, and a thermostat control knob 1294 for setting a cooking temperature of the cooking surfaces of the griddles 1223,1225.

With particular reference now to FIG. 15, in which the housing cover 1282 is in the open-position, the griddles 1223,1225 are perhaps best seen. Moreover, in accordance with one or more aspects and features of the invention, each griddle 1223,1225 includes a respective wiper 1205,1211 by which a pancake or other food item being cooked is dislodged from the respective cooking surface. Each wiper 1205,1211 is received within a respective guide slot or channel 1296,1298 defined in a respective wall of the housing 1286 of the pancake maker apparatus 1200. It will be appreciated that the respective wall is engaged during pivoting movement of the respective griddle by the end of the wiper to drive sweeping movement of the wiper across the cooking surface of the respective griddle.

Figure 16:
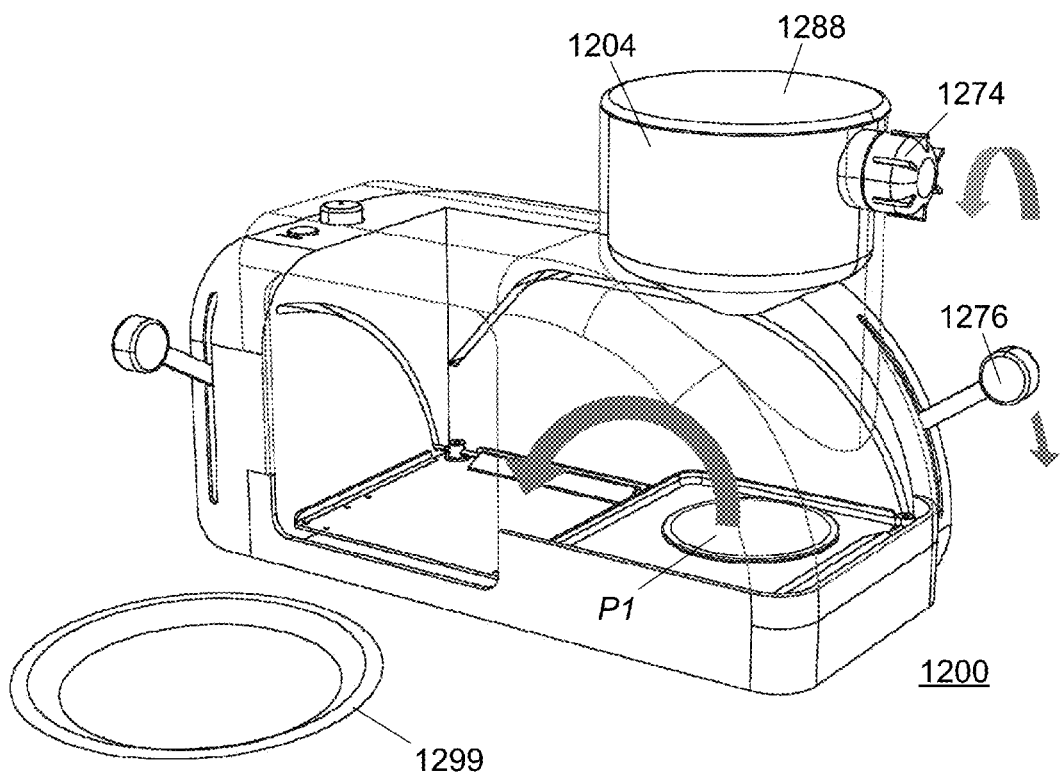
FIG. 16 schematically illustrates operation of the preferred embodiment of the pancake maker apparatus of FIG. 12.
Figure 17:
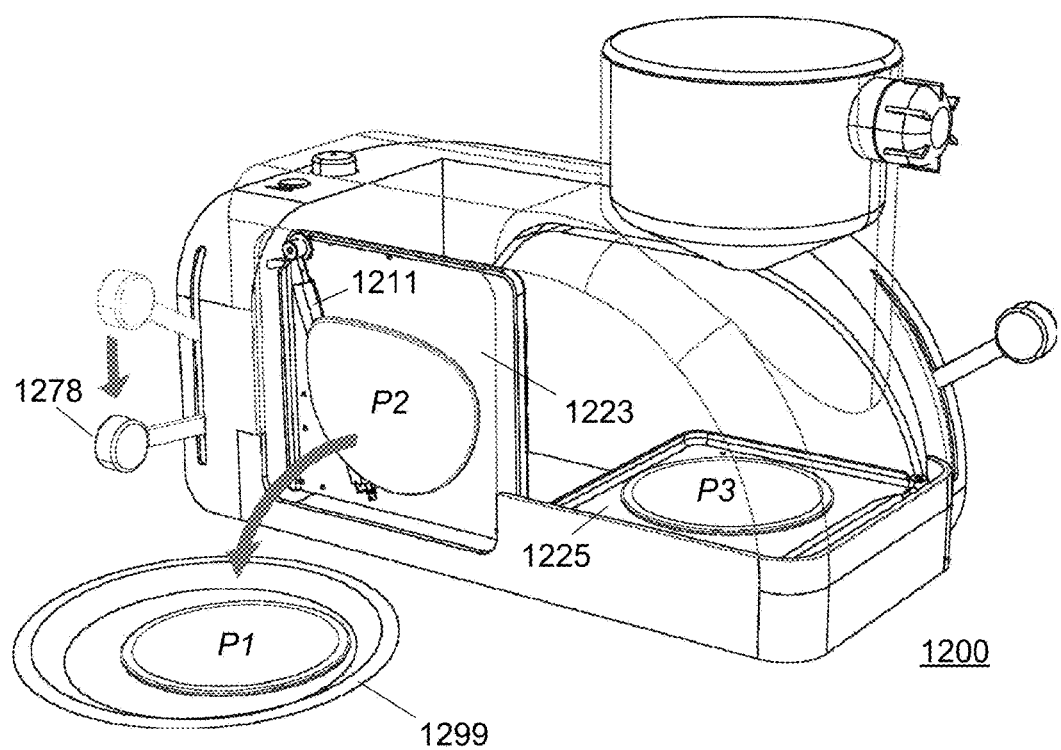
FIG. 17 schematically illustrates further operation of the preferred embodiment of the pancake maker apparatus of FIG. 12.

With respect to operation of the pancake maker apparatus 1200, FIG. 16 schematically illustrates operation of the preferred embodiment of a pancake maker apparatus as represented in FIG. 12 to cook and deliver a pancake to a plate 1299; and FIG. 17 schematically illustrates further operation of the pancake maker apparatus 1200. Specifically, a knob 1274 of the hopper 1204 is turned by hand to dispense a desired amount of pancake batter onto the cooking surface of the griddle 1225. The batter cooks to form a partially cooked pancake P1, as seen in FIG. 16. To cook the other side of the pancake P1, a user pulls lever 1276, thereby activating a lifting mechanism of the first griddle 1225. Pulling the lever 1276 pivots the griddle 1225 as shown by the applicable arrow in FIG. 16, whereupon the pancake P1 falls onto and is transferred to the cooking surface of griddle 1223. When cooked, a user in turn pulls lever 1278 to activate a second mechanism of the second griddle 1223. Pulling the lever 1278 pivots the griddle 1223 as shown, for example, in FIG. 17, whereupon the illustrated pancake P2 falls onto pancake P1 and thereby is transferred to the plate 1299. It will further be appreciated that, as shown in FIG. 17, pancake P3 continues to cook on griddle 1225 during lifting and transfer of the pancake P2; the lifting of griddle 1225 is independent of the lifting of griddle 1223, and vice-versa, the lifting being controlled by user-activation of the respective lever 1276,1278.

With reference to the publication of the current application, i.e., U.S. Patent Application Publication No. US2017/0340165 (the "Application Publication") incorporated herein by reference. FIGS. 18-28 of the Application Publication comprise photographs of a preferred embodiment of the operation of a prototype pancake maker apparatus in accordance with one or more aspects and features of the present invention, which apparatus is similar to that represented in FIGS. 1-11.

In this respect, FIG. 18 of the Application Publication shows the three motors, hopper, arm linkage assemblies, griddles, heating plates, and side rails, as well as user controls for operation of the prototype. In contemplated alternative embodiments, a single motor may be used that selectively drives the different components via a chain or drive belt system.

FIG. 19 of the Application Publication shows another view of the hopper used to contain and dispense the pancake batter.

FIG. 20 of the Application Publication shows operation of the motor associated with the hopper, causing a cam to rotate and depress a lever that, in turn, opens the hopper for dispensing pancake batter onto the first griddle.

FIG. 21 of the Application Publication shows the pancake batter being dispensed from the hopper onto the first griddle, whereat a first side of the pancake is cooked.

FIG. 22 of the Application Publication shows the pancake on the first griddle, now fully cooked, and ready to be flipped onto the second griddle.

FIG. 23 of the Application Publication shows the raising of the first griddle into a position vertically over the second griddle with the pancake being transferred from the first griddle to the second griddle.

FIG. 24 of the Application Publication shows the wiper sweeping the inverted cooking surface of the first griddle, assisting in the detachment of the first side of the pancake—now cooked—during the transfer of the pancake to the second griddle.

FIG. 25 of the Application Publication shows the pancake on the second griddle after the second side has been cooked and is ready to be flipped onto a serving plate. FIG. 25 of the Application Publication further shows a second pancake on the first griddle being concurrently cooked on a first side thereof following additional dispensing of pancake batter from the hopper.

FIG. 26 of the Application Publication shows the pancake having both sides cooked being transferred to a serving plate by raising of the second griddle and concurrent sweeping of the wiper across the cooking surface of the second griddle.

FIG. 27 of the Application Publication similarly shows the pancake having both sides cooked being transferred to a serving plate by raising of the second griddle and concurrent sweeping of the wiper across the cooking surface of the second griddle.

FIG. 28 of the Application Publication shows a fully cooked pancake having been transferred to a serving plate, with a second fully cooked pancake in the process of being transferred to the serving plate.

Additional embodiments similar to that of FIGS. 12-17 are disclosed respectively in FIGS. 29-34, in FIGS. 35-38, and in FIGS. 39-43.

In particular, FIG. 29 of the Application Publication is a schematic perspective view of another embodiment of a pancake maker apparatus 2900 in accordance with one or more aspects and features of the present invention. FIG. 30 of the Application Publication is a schematic plan view of controls for the embodiment of FIG. 29 of the Application Publication, and FIGS. 31-34 of the Application Publication are additional schematic perspective views thereof.

FIG. 35 of the Application Publication is a perspective view of the front of a rendering of a commercial pancake maker 3500 similar to the embodiment of FIG. 29 of the Application Publication; FIGS. 36-37 of the Application Publication are perspective views of the front of the pancake maker 3500; and FIG. 38 of the Application Publication is a perspective view of the back of the pancake maker 2900.

As shown in these drawings, each of the apparatus 2900, 3500 is not automated and includes manual operation of one or more lifting mechanisms and, preferably, operation of a lifting mechanism and associated wiper by manually operating a corresponding lever. Additionally, each further comprises a manual control knob that is rotatable for actuating the dispensing of food onto the cooking surface.

Each apparatus further includes a hopper and a housing cover comprising a support within which the hopper is received and supported in disposition over the cooking surface of the first griddle. The hopper is removably received within and rests upon the support. The housing cover is hingedly attached to a housing of the apparatus for pivotal movement between a closed position, in which the housing cover generally encloses the cooking surfaces, and an open position, in which the cooking surfaces are generally accessible for manual cleaning. Alternatively, the housing cover may be removably attached to the housing for accomplishing the same purpose. In both scenarios, the housing cover preferably is transparent for viewing of items being cooked on the cooking surfaces.

FIG. 39 of the Application Publication is a schematic perspective view of another embodiment of a pancake maker apparatus 3900 in accordance with one or more aspects and features of the present invention. Furthermore, each of FIGS. 40-43 of the Application Publication is a schematic perspective view of components of the pancake maker apparatus 3900. As shown therein, the pancake maker apparatus 3900 includes channels 3996,3998 formed in respective walls of housing 3986 which channels engage ends of the wipers during lifting of the griddles. It will further be appreciated that for illustration purposes two different positions of a wiper of each griddle are shown in FIGS. 40-42 of the Application Publication. Furthermore, FIGS. 41-43 of the Application Publication illustrate the lifting mechanisms, each comprising a respective gearbox and linkage assembly 3936,3938 actuated by a lever. Representative gears 3942, 3940 themselves are illustrated in FIG. 42 of the Application Publication. FIGS. 42-43 of the Application Publication further serve to illustrate and represent embodiments in which a heating element 3933 and thermostat 3935 of a griddle 3932 are connected to and move with the griddle during lifting.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

what is claimed is:

1. A method of making a pancake, comprising the steps of:
   (a) dispensing pancake batter onto a cooking surface of a first griddle of a cooking apparatus in an amount to make a pancake;
   (b) cooking a first side of the pancake on the cooking surface of the first griddle;
   (c) inverting the first griddle of the cooking apparatus such that at least a portion of the cooking surface of the first griddle extends over a cooking surface of a second griddle of the cooking apparatus;
   (d) sweeping the cooking surface of the first griddle to facilitate transfer of the pancake cooking on the cooking surface of the first griddle to the cooking surface of the second griddle thereby resulting in flipping of the pancake for cooking of a second side of the pancake on the cooking surface of the second griddle;
   (e) raising one side of the second griddle of the cooking apparatus so as to predispose the pancake cooking on the cooking surface of the second griddle to fall from the cooking surface of the second griddle; and
   (f) sweeping the cooking surface of the second griddle to facilitate fall of the pancake cooking on the cooking surface of the second griddle from the cooking surface of the second griddle onto a serving plate.

2. The method of claim 1, further comprising dispensing additional pancake batter onto the cooking surface of the first griddle in an amount to make a second pancake while the first pancake is cooking on the cooking surface of the second griddle.

3. The method of claim 1, wherein said steps (a)-(f) are performed using an automated cooking apparatus.

4. The method of claim 1, further comprising biasing a blade of the first wiper into constant engagement with the cooking surface of the first griddle during said sweeping of the cooking surface of the first griddle.

5. The method of claim 1, wherein said sweeping of the cooking surface of the first griddle is performed during the inverting of the first griddle.

6. The method of claim 1, further comprising biasing a blade of the second wiper into constant engagement with the cooking surface of the second griddle during said sweeping of the cooking surface of the second griddle.

7. The method of claim 1, wherein said sweeping of the cooking surface of the second griddle is performed during the raising of the one side of the second griddle.

8. The method of claim 1, wherein the first wiper is mounted to the first griddle for pivoting movement relative thereto, and wherein the second wiper is mounted to the second griddle for pivoting movement relative thereto.

9. A method for making a pancake, comprising:
(a) dispensing pancake batter onto a generally planar cooking surface of a first griddle in an amount to make a single pancake;
(b) cooking a first side of the pancake on the cooking surface of the first griddle;
(c) using a first lifting mechanism, elevating a first side of the first griddle relative to an opposite second side of the first griddle such that a pancake on the cooking surface of the first griddle is predisposed to fall onto a generally planar cooking surface of a second griddle resulting in a flipping of the pancake being cooked, the first griddle being inverted such that at least a portion of the cooking surface of the first griddle extends over the cooking surface of the second griddle;
(d) using a first wiper mounted to the first griddle for pivoting movement relative thereto, sweeping the cooking surface of the first griddle in order to facilitate detachment of the pancake from the first griddle cooking surface;
(e) using a second lifting mechanism, elevating a first side of the second griddle relative to an opposite second side of the second griddle such that a pancake on the cooking surface of the second griddle is predisposed to fall from the cooking surface of the second griddle; and
(f) using a second wiper mounted to the second griddle for pivoting movement relative thereto, sweeping the cooking surface of the second griddle in order to facilitate detachment of the pancake from the cooking surface of the second griddle.

10. The method of claim 9, further comprising dispensing additional pancake batter onto the cooking surface of the first griddle in an amount to make a second pancake while the first pancake is cooking on cooking surface of the second griddle.

11. The method of claim 9, wherein said steps (a)-(f) are performed using an automated cooking apparatus.

12. The method of claim 9, further comprising biasing a blade of the first wiper into constant engagement with the cooking surface of the first griddle during said sweeping of the cooking surface of the first griddle.

13. The method of claim 9, wherein said sweeping of the cooking surface of the first griddle is performed during the elevating of the first side of the first griddle.

14. The method of claim 9, further comprising biasing a blade of the second wiper into constant engagement with the cooking surface of the second griddle during said sweeping of the cooking surface of the second griddle.

15. The method of claim 9, wherein said sweeping of the cooking surface of the second griddle is performed during the elevating of the second side of the second griddle.

16. A method of making a pancake, comprising the steps of:
(a) dispensing pancake batter onto a cooking surface of a first griddle of a cooking apparatus in an amount to make a pancake;
(b) cooking a first side of the pancake on the cooking surface of the first griddle;
(c) a step for inverting the first griddle of the cooking apparatus such that at least a portion of the cooking surface of the first griddle extends over a cooking surface of a second griddle of the cooking apparatus;
(d) a step for sweeping the cooking surface of the first griddle to facilitate transfer of the pancake cooking on the cooking surface of the first griddle to the cooking surface of the second griddle thereby resulting in flipping of the pancake for cooking of a second side of the pancake on the cooking surface of the second griddle;
(e) a step for raising one side of the second griddle of the cooking apparatus so as to predispose the pancake cooking on the cooking surface of the second griddle to fall from the cooking surface of the second griddle; and
(f) a step for sweeping the cooking surface of the second griddle to facilitate fall of the pancake cooking on the cooking surface of the second griddle from the cooking surface of the second griddle onto a serving plate.

17. The method of claim 16, further comprising dispensing additional pancake batter onto the cooking surface of the first griddle in an amount to make a second pancake while the first pancake is cooking on the cooking surface of the second griddle.

18. The method of claim 16, wherein said steps (a)-(f) are performed using an automated cooking apparatus.

19. The method of claim 16, further comprising biasing a blade of the first wiper into constant engagement with the cooking surface of the first griddle during said sweeping of the cooking surface of the first griddle.

20. The method of claim 16, further comprising biasing a blade of the second wiper into constant engagement with the cooking surface of the second griddle during said sweeping of the cooking surface of the second griddle.

* * * * *